S. W. & J. F. Palmer.
Faucet.
Nº 93,222. Patented Aug. 3, 1869.
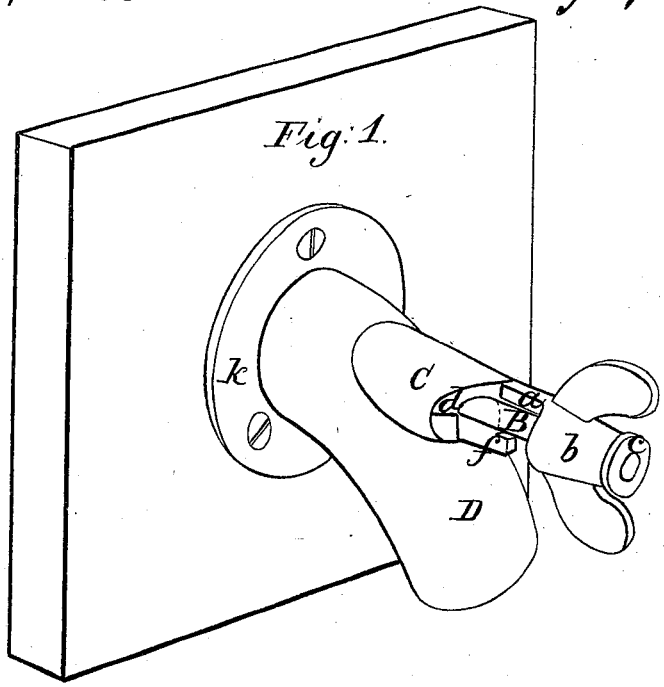
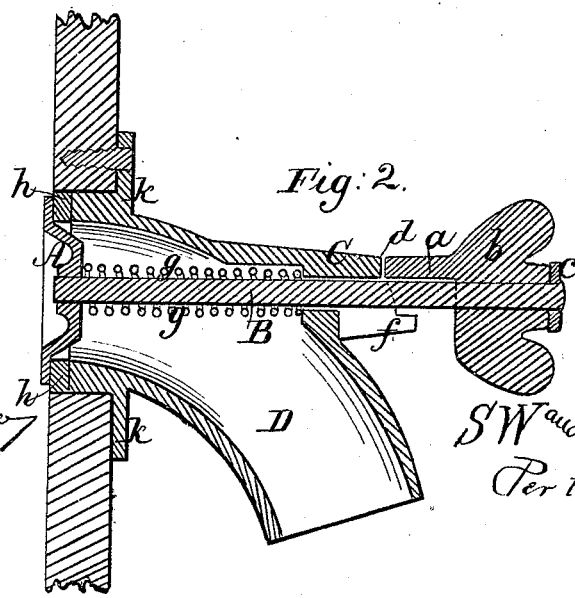
Witnesses.
W. Bailey
Wm. H. McCabe
Inventors.
S. W. and J. F. Palmer
Per their atty.

United States Patent Office.

S. W. PALMER AND J. F. PALMER, OF AUBURN, NEW YORK, ASSIGNORS TO "THE METROPOLITAN WASHING-MACHINE COMPANY," OF MIDDLEFIELD, CONNECTICUT.

Letters Patent No. 93,222, dated August 3, 1869.

IMPROVEMENT IN FAUCETS.

The Schedule referred to in these Letters Patent and making part of the same.

*To whom it may concern:*

Be it known that we, S. W. PALMER and J. F. PALMER, of Auburn, in the county of Cayuga, and State of New York, have invented certain new and useful Improvements in Faucets for Washing-Machines, and other purposes; and we hereby declare the following to be a full, clear, and exact description of the same, reference being had to the accompanying drawings, in which—

Figure 1 is a perspective view of a faucet, made in accordance with our invention.

Figure 2 is a longitudinal central section of the same.

The object of this invention is to produce a cheap, durable, and effective faucet for washing-machines, and for other uses; and, to this end, The invention consists—

First, in the employment, with the valve which is applied to the orifice to be closed, of a valve-stem, having mounted upon it a stud and thumb-piece, as hereinafter described, said stem being supported in a tubular bearing, which guides the valve, and is constructed so that its outer end shall form a spiral incline, upon which the said stud, when rotated, moves, so as to effect the opening or closing of the valve.

Second, in the combination, with the valve and valve-operating devices specified, of the aforesaid tubular bearing, and a waste-pipe connected with said parts, and constructed as hereinafter set forth.

Third, in other features, which will be presently described.

To enable others skilled in the art to understand and use our invention, we will now proceed to describe the manner in which the same is or may be carried into effect, by reference to the accompanying drawings.

The valve, which closes the orifice in the wash-tub, or other part to which the faucet is to be applied, is represented at A.

United with it is the stem B, which extends out from the tub, and carries on its outer part a stud or projection, $a$, united with the thumb-piece $b$, mounted on the stem B, so as to be capable of turning thereon, and secured in place by a washer, $c$, or other suitable means.

Encircling the stem B, so as to lie in the path of the movement of the finger or stud $a$, which revolves with the thumb-piece $b$, is a spiral incline, $d$, upon which the end of the stud rests, such incline being formed on the tubular part C, which constitutes the bearing for the stem B.

This tubular bearing and incline is mounted on the bent waste or discharge-pipe, or nozzle D, and, if desired, can be cast in one piece with such pipe.

The pipe, it will be noticed, is bent off to one side, so as to allow the tubular bearing to be arranged on the prolongation of the orifice in the tub.

It will be seen, that by rotating the thumb-piece $b$, the stud or finger $a$ will be caused to gradually ascend the incline $d$, and thus draw out the stem B, which, in turn, draws up the valve A tightly in its seat. The flange of the valve only rests in the seat, which, to insure a tight joint, is provided with a washer or packing of India rubber, $h$.

The stem and valve need have no rotary movement, but only a longitudinal movement, the thumb-piece $b$ being alone revolved.

In the drawing, the incline is represented as making one revolution around the stem; but, of course, its length may be greater or less than this, if desired.

A stop, $f$, is provided at each end of the spiral, to limit the movement of the stud $a$.

Thus, by turning the thumb-piece in one direction or the other, so as to cause the stud $a$ to either ascend or descend the incline, the valve can be readily opened or closed, as desired.

In order to hold the valve open, when the stud is in its lowest position, against the force of the water rushing out through the waste-pipe, or against any other agency which might otherwise tend to close it, I provide a spiral spring, $g$, encircling the stem B, or other suitable spring, compressed between the valve and the inner end of the tubular bearing, or its equivalent in this respect.

The pipe D is formed so that its inner end shall fit in the orifice formed in the wash-tub, thus forming, in conjunction with the rubber packing-ring, the seat for the valve.

The pipe is also cast with a flange, K, by which it is fastened to the tub, so that the whole device, made thus cheaply and compactly, can, by means of a few screws, be connected, with the greatest ease, with tub or other vessel with which it is to be used.

Having now described our invention, and the manner in which the same is or may be carried into effect,

What we claim, and desire to secure by Letters Patent, is—

1. The combination of the valve, and the valve-stem and stud, and thumb-piece mounted on the same, as described, with the tubular bearing for supporting said stem, having its outer end so constructed as to form an incline, upon which said stud, when rotated, will move so as to cause the opening or closing of the valve, substantially as shown and set forth.

2. The combination, with the valve, and devices for operating the same, hereinbefore recited, of the tubular bearing for the valve-stem, and the discharge-pipe, with which said bearing is connected, said parts being constructed and operating substantially as set forth.

3. The combination, with the valve and valve-operating devices, as hereinbefore described, of a spring, arranged, substantially as set forth, so as to hold the valve open against the pressure of water passing through the faucet.

4. A faucet for washing-machines, and other purposes, all parts of which are constructed and arranged for operation, as herein shown and set forth.

In testimony whereof, we have signed our names to this specification, before two subscribing witnesses.

S. W. PALMER.
J. F. PALMER.

Witnesses:
F. G. DAY,
J. H. CHEEVER.